United States Patent Office 3,705,209
Patented Dec. 5, 1972

3,705,209
FLAME RETARDANT POLYMERIC COMPOSITIONS
Albert S. Matlack, Hockessin, and Robert J. Schwarz, Sherwood Park II, Del., assignors to Hercules Incorporated, Wilmington, Del.
No Drawing. Filed Feb. 26, 1970, Ser. No. 14,680
Int. Cl. C09k 3/28
U.S. Cl. 260—861        6 Claims

ABSTRACT OF THE DISCLOSURE

Readily flammable polymers are rendered flame retardant by the addition of 8 to 20% of a bromine-containing polyether which is a polymer of a bromo-substituted oxetane or 3 to 20% of the bromine-containing polyether and 1 to 15% of an antimony compound. When antimony is present the combined amount of bromine-containing polyether and antimony compound is at least 5% by weight of the total composition.

---

This invention relates to improving the flame retardancy of polymers without major impairment of the physical and mechanical properties of the polymer and to the improved flame retardant compositions produced thereby.

It is known that the flame retardancy of readily flammable plastics can be improved by the incorporation of halogen compounds, and particularly chlorinated hydrocarbons therein. Relatively large amounts of the chlorinated hydrocarbon and an inorganic flame retardant such as antimony trioxide, however, are required to produce an acceptable flame resistant plastic. The inclusion of such large amounts of flame retardant materials in plastics results in an impairment of the physical properties of the plastics.

It is also known that certain bromine compounds are more effective flameproofing agents than the corresponding chlorine compounds, and that flame retardancy can be achieved with much smaller amounts of additives. Most bromine-containing compounds, however, are not stable at the elevated temperatures required for molding or spinning into fibers such polymers as polypropylene, polyamides and the like.

It is an object of the present invention to provide flame retardant polymeric compositions using particularly small amounts of flame retardant additives. Another object is to provide compositions which can be molded into articles which meet the various established flame retardancy standards and at the same time have improved physical properties.

Now in accordance with the present invention it has been found that the aforesaid objects can be achieved through the use of polymeric compositions which contain as a flame retardant, based on the weight of the composition, from 8 to 20% and preferably from 8 to 12% of a bromine-containing polyether when the polyether is the sole flame retardant or from 3 to 20% and preferably from 3 to 10% of said polyether combined with from 1 to 15% and preferably from 1 to 5% of an antimony compound, the combined amount tof said polyether and antimony compound being at least 5%, said polyether having a bromine content of at least 48% and being a polymer of

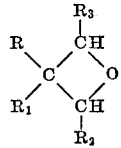

where R is a bromine substituted methyl group, $R_1$ is R, chloromethyl, alkoxymethyl or an alkyl group, and $R_2$ and $R_3$ are hydrogen or an alkyl group.

In the above formula R, as stated is a bromine substituted methyl group and can be —$CH_2Br$, —$CHBr_2$ or —$CBr_3$. $R_1$, in addition to being chloromethyl, alkoxymethyl or alkyl can also be a bromine substituted methyl group, i.e., a —$CH_2Br$, —$CHBr_2$ or —$CBr_3$ group and can be the same as or different from the R substituent. Suitable alkyl groups which $R_1$, $R_2$ and $R_3$ can be will generally contain from 1 to 18 carbon atoms and typically from 1 to 6 carbon atoms. Particularly preferred alkyl groups are methyl, and ethyl groups. Likewise the alkoxy group of the alkoxymethyl substituents which $R_1$ can comprise will usually contain from 1 to 18 carbon atoms and preferably from 1 to 6 carbon atoms. Ethoxymethyl substituents are particularly preferred.

The flame retardant compositions of the present invention meet the requirements of ASTM D-635 and have a combustion index of at least 0.21, measured according to the method of C. P. Fenimore and F. C. Martin, "Combustion and Flame," 10, 135 (1966). Thus the invention provides flame retardant compositions from polymers with very little or no antimony compound, and relatively low amounts of the bromine-containing polyether. Moreover, because of the small amount of flame retardant constituents required, the compositions have improved physical properties, such as for example, greater impact strength, higher flexural strength, higher tensile strength and decreased opacity as compared with the prior art flame retardant compositions containing much larger amounts of halogenated material and antimony trioxide. Additionally, because the bromine-containing polyether is thermally stable at conventional molding or extrusion temperatures, problems of discoloration and voiding in molded articles, mold corrosion, or loss of additives during processing are not encountered.

The polyethers useful in the present invention contain at least 48% bromine and preferably from 60 to 70% bromine and are homopolymers of an oxetane containing one or two bromine-substituted-methyl groups in the 3-position or copolymers thereof with up to about 50 molar percent of a different epoxide which can be an oxirane or oxetane. Monomers that can be copolymerized with the above mentioned oxethane include the alkylene oxides such as ethylene oxide, propylene oxide, 1-butene oxide, cis and trans 2-butene oxides, isobutylene oxide, 1-hexene oxide; the substituted alkylene oxides such as cyclohexene oxide, epoxycyclooctene, styrene oxide; the alkyl glycidyl ethers such as methyl glycidyl ether, ethyl glycidyl ether, methylethyl glycidyl ether and butyl glycidyl ether; glycidyl ethers of phenol, bis-phenol and the like; unsaturated epoxides such as vinyl cyclohexene mono- and di-oxides, butadiene monoxides, allyl glycidyl ether, allyl phenyl glycidyl ether and crotyl phenyl glycidyl ether; halogen containing epoxides such as epichlorohydrin, epibromohydrin, epifluorohydrin, perfluoropropylene oxide, perfluoroethylene oxide; the cis and trans 1,4-dihalo-2,3-epoxy-butanes; the 1,1,1-trihalo-3,4-epoxy butanes; and a different oxethane which can be oxacyclobutane itself, oxacyclobutane carrying on one or more of the carbon atoms substituents such as halogen, cyanide, hydroxyl, alkoxy, acyloxy, aryloxy, halomethyl, cyanomethyl hydroxymethyl, alkoxymethyl, acyloxymethyl, aryloxymethyl and the like. Typical polyethers that can be used are those described in U.S. 3,205,207 and 3,341,475.

The polyethers of the invention will have a weight average molecular weight of at least about 700 and preferably of the order of about 3000 and higher. The polyethers can be prepared in known manner, as by polymerizing the bromo-substituted oxetane or mixtures thereof with a different epoxide using a Friedel-Crafts catalyst or by the procedure described in U.S. 3,205,183.

The polymers which can be made flame retardant in accordance with this invention are any of the readily flammable thermoplastic or thermosetting rubbery or plastic resins which have a combustion index less than 0.20 and which find utlity in extrusion and molding applications. Exemplary of the polymers which can be so flame-proofed include the hydrocarbon polymers including saturated, unsaturated, linear, atactic, crystalline or nonlinear amorphous polymers, copolymers, terpolymers, etc. as for example polyethylene, polypropylene, poly(4-methyl pentene-1), polybutene-1, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc. and blends of these polymers with each other. In addition, nonhydrocarbon polymers such as the unsaturated polyesters; drying and nondrying alkyd resins; polyurethanes; poly(alkylene oxides) such as poly(ethylene oxide) and poly(propylene oxide), etc.; poly(arylene oxides) such as poly(phenylene oxide), etc.; the polyamides such as nylon, perlon-L, etc.; poly(vinyl alkyl ethers) such as poly(vinyl methyl ether), etc.; ethylene-vinylacetate copolymers; poly(ethyl acrylate), poly(ethyl methacrylate); polysulfone; epoxy resins; butadiene-acrylonitrile copolymers; butadiene-acrylonitrile-styrene terpolymers; etc. can be made flame retardant in accordance with this invention. The preferred polymers are homopolymers or random, block or graft copolymers of α-olefins containing from 2 to 6 carbon atoms, the polystyrenes, the polyamides, the polyurethanes, and the unsaturated polyesters. Particularly preferred are the polymers of propylene. These polymers usually have molecular weights between about 100,000 and 800,000 or higher and can be produced by well known and conventional methods. Particularly useful are stereoregular or isotactic polypropylenes having a melt index range of at least about 0.3 to 20 and preferably about 3 to 5. Typical comonomers useful for the preparation of propylene copolymers include other α-olefins such as ethylene, butene-1, 3-methyl butene-1, 4-methyl pentene-1, dodecene-1, styrene and the like. Typical comonomers which can be grafted to the propylene polymer chain to give a so-called graft copolymer include vinyl acetate, vinyl propionate, the acrylic and methacrylic esters of aliphatic alcohols and the like.

In addition to the bromine-containing polyether, the composition of the invention can also contain an antimony compound such as antimony trioxide, triphenylstibine, antimony sulfide, antimony naphthenate or the like as flame retardant. Small amounts of other additives such as stabilizing agents, lubricants, dye additives, pigments, antistatic agents and the like, up to a total of about 10% by weight of the composition can also be present provided, of course, that the amount of such additives does not detract from the flame retardancy of the composition.

The compositions of the invention can be prepared by mixing the polymer with the flame retardant, i.e. the bromine-containing polyether and antimony compound, if present, in conventional manner, e.g. on roll mills, kneaders or extruders or by agitating in the presence of an organic solvent. Since uniform mixing of the constituents is essential to reliable results, the mixing operation when the polymer is a thermoplastic resin is preferably carried out by first dry mixing the ingredients and then subjecting the dry mixture to intensive mechanical working at elevated temperatures above the softening point of the polymer and most conveniently by means of compounding rolls, a Banbury mixer or extruder and continuing the working until a uniform mixture is obtained.

The compositions of the invention are suitable for the production of molded articles by the usual processing methods and are particularly suitable for the production of film, fiber and plastic molded articles.

The invention is further illustrated by the following examples wherein all parts and percentages are by weight unless otherwise specified. Throughout this specification the term "flame retardant" is used to designate a composition or article which will be self-extinguishing or non-burning when tested according to ASTM D-635 and will have a combustion index of at least 0.21.

EXAMPLES 1 TO 6

In these examples various molding compositions were made by intimately blending stereoregular polypropylene with the flame retardant(s) on a two-roll mill at 175° C. for 10 minutes and then compression molding the blends into ⅛ inch plaques using a 4,000 p.s.i.g. press at 235° C. for 5 minutes. The polypropylene used in these examples was a commercial stereoregular polypropylene having a melt index of 4, and an RSV (determined on a 0.1% solution in decahydronaphthalene at 135° C.) of 2.9. The bromine-containing polyether was poly[3,3-bis(bromomethyl)oxetane] containing 65.6% bromine. The polyether had a softening point of about 222° C., and was insoluble at 100° C. in cyclohexanone, toluene and α-chloronaphthalene. The antimony trioxide, when present, was in finely divided form and passed a U.S. Standard Sieve No. 200.

Details as to the amount of each component in the compositions and flame retardancy test results on the molded plaques therefrom are given in the following Table I.

TABLE I

| Ex. number | Composition (parts by weight) | | | Flame retardancy | |
| --- | --- | --- | --- | --- | --- |
| | Polypropylene | Poly[3,3-bis-(bromomethyl)-oxetane] | Antimony trioxide | Combustion index | Rating (ASTM D-635) |
| Control A | 100 | | | 0.178 | Burning. |
| 1 | 92 | 8 | | .212 | Self-extinguishing. |
| 2 | 90 | 10 | | 0.220 | Do. |
| 3 | 91 | 6 | 3 | 0.249 | Nonburning. |
| 4 | 90 | 5 | 5 | 0.244 | Do. |
| 5 | 95 | 3 | 2 | 213 | Self-extinguishing. |
| 6 | 95 | 4 | 1 | 224 | Do. |
| Control B | 95 | | 5 | 0.178 | Burning. |

EXAMPLE 7

A molding composition was prepared by mixing with vigorous agitation in a vessel 92 parts of a commercial polystyrene having a molecular weight of 270,000 to 280,000 (as a 10% solution in methylene chloride) and 8 parts of the bromine-containing polyether of Examples 1 to 6 and then drying the mixture under vacuum. The dried composition was ground into molding powder and molded into ⅛ inch plaques using a 4,000 p.s.i.g. press at 175° C. for 10 minutes. Flame retardancy test results on the molded plaques gave a combustion index of 0.235 and the plaques were rated as non-burning according to ASTM D-635. A control treated in the same manner except that no bromine-containing polyether was present had a combustion index of 0.183 and was burning.

EXAMPLE 8

Molding compositions were prepared by intimately mixing in a vessel 87 parts of a commercial, room temperature curable unsaturated polyester system comprising 16% maleic anhydride, 25% phthalic anhydride, 28% propylene glycol and 31% styrene, 8.7 parts of the bromine-containing polyester of Examples 1 to 6, 4.3 parts of antimony trioxide and 0.9 part of methyl ethyl ketone peroxide curing catalyst. The composition was cast in molds into ⅛ inch plaques and cured at room temperature for 24 hours. Flame retardancy test results on the molded plaques gave a combustion index of 0.236 and the plaques were rated as non-burning according to ASTM D-635. A control treated in the same manner except that no bromine-containing polyether was present had a combustion index of 0.185 and was burning.

Wheat we claim and desire to protect by Letters Patent is:

1. A flame retardant composition comprising a blend of a readily flammable polymer having a combustion index less than 0.20 and being selected from the group consisting of polymers of mono-α-olefins containing from 2 to 6 carbon atoms, polystyrene and cured unsaturated polyesters prepared from maleic anhydride, phthalic anhydride and propylene glycol in admixture with styrene, and as a flame retardant, based on the weight of the composition, 8 to 20% of a bromine-containing polyether when said polyether is the sole flame retardant or 3 to 20% of said polyether combined with 1 to 15% of the combined amount of said polyether and antimony trioxide being at least 5%, said polyether having a weight average molecular weight of at least about 700 and having a bromine content of at least 60% and being a polymer of

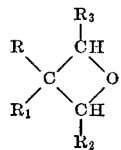

where R is —CH$_2$Br, —CHBr$_2$ or —CBr$_3$, R$_1$ is R or chloromethyl and R$_2$ and R$_3$ are hydrogen or an alkyl group containing from 1 to 6 carbon atoms.

2. The composition of claim 1 wherein the polyether is a polymer of 3,3-bis(bromomethyl)oxetane.

3. The composition of claim 2 wherein the polymer is a polyolefin.

4. The composition of claim 3 wherein the polyolefin is polypropylene.

5. The composition of claim 2 wherein the polymer is a cured unsaturated polyester prepared from maleic anhydride, phthalic anhydride and propylene glycol in admixture with styrene.

6. The composition of claim 2 wherein the polymer is polystyrene.

References Cited
UNITED STATES PATENTS

| | | | |
|---|---|---|---|
| 3,470,116 | 9/1969 | Praetzel et al. | 260—2.5 |
| 2,947,722 | 8/1960 | Boardman | 260—45.85 |
| 2,895,921 | 7/1959 | Price | 260—2 |
| 3,347,822 | 10/1967 | Jenkner | 260—45.75 |
| 2,664,411 | 12/1953 | Cooper | 260—28.5 |
| 3,271,344 | 9/1966 | Lowes, Jr. | 260—29.6 |
| 3,382,204 | 5/1968 | Gouinlock, Jr. | 260—33.8 |
| 3,065,188 | 11/1962 | Vandenberg | 260—2 |
| 3,252,936 | 5/1966 | Richart | 260—45.8 |

DONALD E. CZAJA, Primary Examiner

R. A. WHITE, Assistant Examiner

U.S. Cl. X.R.

106—15 FP; 252—8.1; 260—45.7 R, 45.75 R, 874, 897 C